Dec. 25, 1956    R. E. SMITH ET AL    2,775,122
VERTICAL VELOCITY COMPUTER
Filed March 2, 1953    2 Sheets-Sheet 1
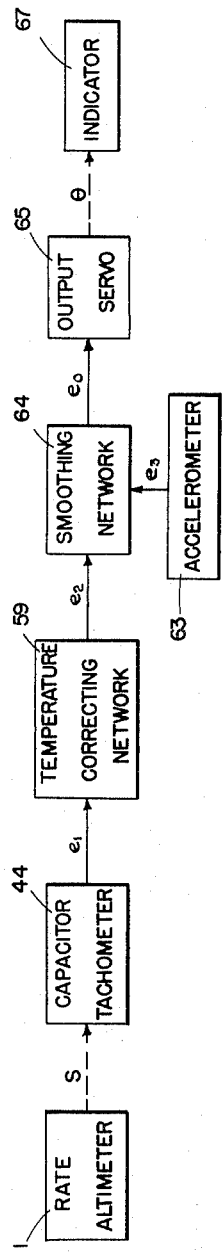
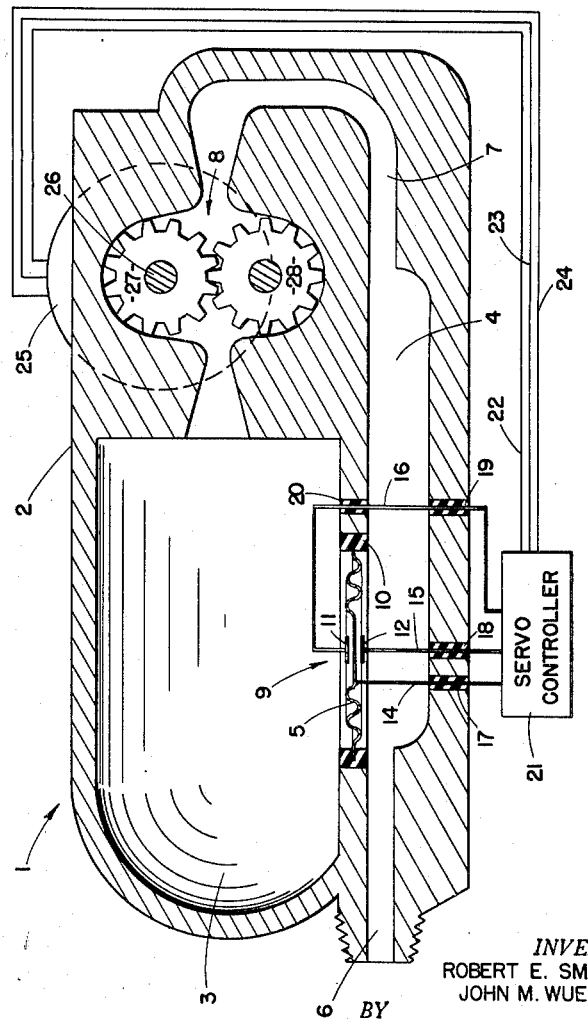
INVENTORS
ROBERT E. SMITH
JOHN M. WUERTH
BY William R. Lane
ATTORNEY

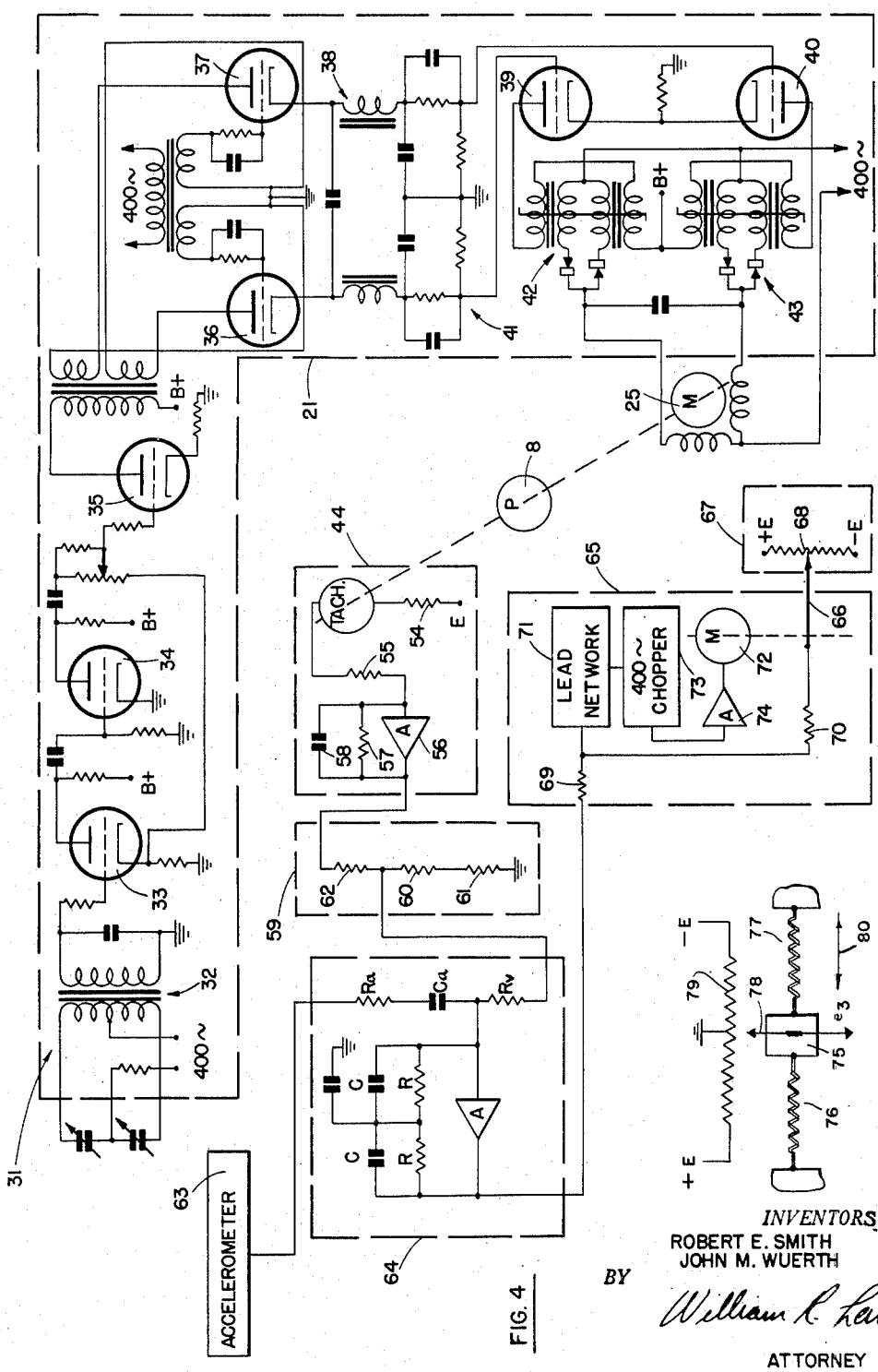

United States Patent Office

2,775,122
Patented Dec. 25, 1956

2,775,122

VERTICAL VELOCITY COMPUTER

Robert E. Smith, Downey, and John M. Wuerth, Whittier, Calif., assignors to North American Aviation, Inc.

Application March 2, 1953, Serial No. 339,598

17 Claims. (Cl. 73—179)

This invention relates to vertical velocity computers and particularly to an improved device for accurately measuring the vertical velocity component of an aircraft.

As the altitude of an object above sea level is increased the corresponding static atmospheric pressure effective upon it decreases. The vertical velocity component of a device in air is essentially a rate of change of altitude and therefore is equal to some function of the rate of change of the static atmospheric pressure. The problem is to provide a device which accurately measures changes in atmospheric pressure and converts the rate of change of pressure into a continuous reading of the vertical velocity component of the device.

It is therefore an object of this invention to provide a vertical velocity computer which detects the rate of change of static atmospheric pressure to continuously and accurately measure the vertical velocity component of an object in air.

It is another object of this invention to provide an improved rate of climb and rate of descent indicator for an aircraft.

It is a further object of this invention to provide means for measuring the rate at which a compressible fluid is added to or removed from a constant volume sealed chamber in order to vary the pressure in said chamber at the same rate as changes in a variable compressible fluid pressure to thereby continuously and accurately measure the rate of change of said variable fluid pressure.

It is another object of this invention to provide apparatus for measuring the volumetric rate at which air at static atmospheric pressure is added to or removed from a constant volume sealed chamber in order to change the air pressure in said chamber at the same rate as changes in the static atmospheric pressure to thereby continuously and accurately measure the vertical velocity component of the apparatus in air.

It is a further object of this invention to provide in an aircraft a vertical velocity computer which utilizes a constant volume sealed chamber of air, a detector sensitive to the pressure differential between said chamber and the static atmosphere, and a constant volume displacement pump between said chamber and the static atmosphere responsive to said detector in a manner to maintain said pressure differential substantially at zero by adding or removing air at atmospheric pressure from said chamber whereby the rate of displacement of said pump is a measure of the rate of climb or rate of descent of the aircraft.

It is another object of this invention to provide a highly accurate vertical velocity computer which measures the rate at which air at atmospheric pressure is added to or removed from a constant volume sealed chamber in order to change the air pressure in said chamber at the same rate as the static atmospheric pressure is changed, which compensates this measured rate for variations in the ambient temperature of the atmosphere and which corrects the compensated rate for any time delays in errors due to vertical accelerations to thereby continuously obtain a highly sensitive indication of the vertical velocity in air.

Further objects of this invention will become apparent from the following description taken in connection with the accompanying drawings, in which Fig. 1 is a sectioned view of the preferred embodiment of the vertical velocity computer contemplated by this invention;

Fig. 2 is a block diagram of an embodiment of a highly accurate vertical velocity computer contemplated by this invention;

Fig. 3 is a schematic drawing of the capacitor tachometer of Fig. 2;

Fig. 4 is a schematic drawing of the embodiment of the vertical velocity computer of Fig. 2;

And Fig. 5 is a schematic drawing of the linear accelerometer of Fig. 2.

Referring to Fig. 1 the preferred embodiment of the rate altimeter utilized by this invention is shown. When the altitude of an aircraft carrying rate altimeter 1 of Fig. 1 is changed, the rate altimeter detects the corresponding changes in static atmospheric pressure and continuously converts the rate of pressure change into an angular velocity which is an accurate measure of the vertical velocity component of the aircraft. Chambers 3 and 4 in casing 2 are separated by flexible diaphragm 5. Chamber 3 is a sealed insulated chamber containing air at substantially atmospheric pressure. The insulation of chamber 3 is preferably accomplished by supporting casing 2 in an insulated chamber (not shown) in the aircraft. A source (not shown) of static atmospheric pressure is coupled to chamber 4 through inlet duct 6. Diaphragm 5 is responsive to the pressure differential between the two chambers. Duct 7 interconnects chambers 3 and 4 but free passage of air between the chambers is prevented by air pump 8. Any air flowing from the outside atmosphere through ducts 6 and 7 and chamber 4 remains at static atmospheric pressure but acquires the temperature of the air in chamber 3. Air pump 8 is a bidirectional, constant volume displacement gear pump. Since there is only a very small pressure differential between the inlet and outlet sides of pump 8, the efficiency of the pump is very high.

Capacitor pick-off 9 is positioned to be sensitive to the movement of pressure sensitive diaphragm 5. Pick-off 9 is composed of flexible diaphragm 5, and fixed capacitor plates 11 and 12. Diaphragm 5 is formed from a conductive material and is electrically insulated from casing 2 by insulating ring 10. Capacitor plate 11 is positioned in chamber 3 while capacitor plate 12 is positioned in chamber 4. Plates 11 and 12 are positioned at predetermined distances on each side of the normally balanced position of diaphragm 5. Conductors 14, 15, and 16 connect diaphragm 5, capacitor plate 12 and capacitor plate 11, respectively, to input terminals of servo controller 21. A two-phase voltage output, having a phase sequence and a magnitude which is a continuous measure of the instantaneous position of diaphragm 5 relative to capacitor plates 11 and 12, is produced by controller 21. This voltage output actuates pump motor 25 through leads 22, 23, and 24. Output shaft 26 of motor 25 is keyed to gear 27 of gear pump 8. Gear 27 is meshed with follower gear 28. Gears 27 and 28 are designed to pump a volume of gas which is linearly proportional to the angular rotation of shaft 26.

The desired output of rate altimeter 1 of this invention is a shaft angular velocity which is directly proportional to the vertical velocity component of the aircraft. By referring to the following equations, the relationship between shaft speed S, vertical velocity $v$ and ambient atmospheric temperature $T_a$ is found. The rate of change of the mass of air in chamber 3, $$\frac{dm}{dt}$$

caused by rotation of shaft 26 at speed S is $$\frac{dm}{dt} = -Sk\rho_s \qquad (1)$$

where $k$ is the volume of gas taken out of sealed chamber 3 per revolution of gear pump 8 and is a constant for a given pump design and $\rho_s$ is the instantaneous mass density of the gas in sealed chamber 3. Since the volume V of sealed chamber 3 is a constant established by the design of rate altimeter 1 and is negligibly affected by any slight movement of diaphragm 5, the rate of change of mass, $$\frac{dm}{dt}$$

is also related to the rate of change of density as follows:

$$\frac{dm}{dt} = V \frac{d\rho_s}{dt} \qquad (2)$$

Substituting Equation 2 in Equation 1 produces $$V \frac{d\rho_s}{dt} = -Sk\rho_s \qquad (3)$$

If the gas within sealed chamber 3 obeys the perfect gas law, then $$\rho_s = \frac{P_s}{RT_s} \qquad (4)$$

where $P_s$ is the instantaneous pressure of the gas in sealed chamber 3, R is the gas constant and $T_s$ is the absolute temperature of the gas in sealed chamber 3. Differentiating Equation 4 and simplifying by substituting $\rho_s$ for $$\frac{P_s}{RT_s}$$

produces $$\frac{d\rho_s}{dt} = \frac{\rho_s}{P_s} \frac{dP_s}{dt} - \frac{\rho_s}{T_s} \frac{dT_s}{dt} \qquad (5)$$

Substituting Equation 5 in Equation 3 and solving for the shaft speed S, produces $$S = -\frac{V}{kP_s} \frac{dP_s}{dt} + \frac{V}{T_s k} \frac{dT_s}{dt} \qquad (6)$$

Since the temperature of the gas in insulated sealed chamber 3 is maintained substantially constant, the second term of Equation 6 can be neglected. Equation 6 therefore reduces to $$S = -\frac{V}{kP_s} \frac{dP_s}{dt} \qquad (7)$$

Assuming a static atmosphere, the relationship between vertical velocity $v$ of the aircraft and the rate of change of static atmospheric pressure $$\frac{dP_a}{dt}$$

is $$\frac{dP_a}{dt} = -\frac{gP_a}{RT_a} v \qquad (8)$$

where $T_a$ is the absolute temperature of the outside atmosphere, $P_a$ is the static atmospheric pressure and $g$ is the gravitational constant. The purpose of the closed servo loop, consisting of pick-off 9, servo controller 21, and gear pump 8, utilized in rate altimeter 1 of this invention is to maintain the rate of change of pressure in chamber 3 continuously equal to the rate of change of static atmospheric pressure. Therefore, $$\frac{dP_a}{dt} = \frac{dP_s}{dt}$$

Substituting the value for $$\frac{dP_a}{dt}$$

of Equation 8 for $$\frac{dP_s}{dt}$$

in Equation 7 produces $$S = \frac{V}{kP_s} \cdot \frac{gP_a}{RT_a} v \qquad (9)$$

The high sensitivity of pick-off 9 and the high gain of servo controller 21 make pressure $P_s$ only negligibly different from pressure $P_a$. Equation 9 reduces to $$S = \frac{Vg}{kR} \cdot \frac{v}{T_a} \qquad (10)$$

By combining the constants, $g$, $V$, $k$, and R, Equation 10 reduces to $$S = A_1 \frac{v}{T_a} \qquad (11)$$

This is the relationship between angular velocity S of shaft 26, vertical velocity $v$ of the aircraft and absolute ambient atmospheric temperature $T_a$. By accurately measuring the angular velocity of shaft 26 and correcting the measurement for any changes in the ambient atmospheric temperature, an accurate reading of the instantaneous vertical velocity is obtained.

Referring to Fig. 4, a schematic drawing of servo controller 21 is shown. The two capacitors of pick-off 9 are a part of bridge network 31. Normally, when the aircraft does not have a vertical velocity component, the pressures in chambers 3 and 4 of Fig. 1 are equal and bridge network 31 is balanced. A vertical velocity of the aircraft changes the pressure in chamber 4 resulting in a pressure differential between chambers 3 and 4 which causes diaphragm 5 to move. Movement of diaphragm 5 in response to this pressure differential changes the relative capacitances of the capacitors thereby unbalancing the bridge. The output signal of bridge 31 appears across the secondary of transformer 32 with a magnitude and a phase which is determined by the magnitude and direction of displacement of diaphragm 5. The error signal is amplified through preamplifier tubes 33, 34, and 35. Resistance coupling is used between the tubes and a negative feedback is incorporated in the circuit in order to stabilize the gain and minimize the effect of noise introduced by stray pickup in the amplifier circuit.

The output of the final preamplifier stage is coupled into a demodulator circuit including demodulator tubes 36 and 37 and LC filter network 38. The error signal which is passed through the preamplifier stages is impressed on the plates of tubes 36 and 37. Although the plates of tubes 36 and 37 are connected to vary in phase with each other in response to this error signal, the voltages applied to the grids of tubes 36 and 37 are 180° out of phase with each other. Under these conditions only one tube conducts, becoming a half-wave rectifier. The phase of the error signal determines which of tubes 36 and 37 conducts. The demodulator circuit is, therefore, essentially a phase sensitive rectifier with an LC filter and has, as an output, a D.-C. voltage which varies in magnitude with the magnitude of the error signal and has a polarity determined by the phase of the error signal. The demodulator circuit, as shown in Fig. 4, is constructed symmetrical with respect to ground to eliminate any unbalancing effect due to stray capacitances.

The output voltage of filter 38 is coupled to power amplifier tubes 39 and 40 through RC lead network 41. The leading phase shift introduced by lead network 41 compensates for the lag introduced by the inertia of the mechanical parts of the system and the delay in the demodulator and power amplifier portions of the circuit. In response to the error signal, power amplifier tubes 39 and 40 provide the control for the magnetic amplifier stage. In essence, the magnetic amplifier stage remodulates the signal and provides the power necessary to drive motor 25.

When power amplifier tubes 39 and 40 are in a quiescent state, that is, when no error signals are applied to their grids, the plate currents of the tubes are sufficient to cause the control windings of self-saturating magnetic amplifiers 42 and 43 to maintain their cores in a demagnetized condition. The load windings of amplifiers 42 and 43 continuously have a very high inductive reactance thereby drastically limiting the amount of current flowing through the windings of two phase induction motor 25 from the source (not shown) of 400 C. P. S. voltage. Under these conditions the rotor of motor 25 does not turn.

By impressing a negative error signal on one of the grids of tubes 39 and 40, the corresponding plate current is materially reduced. Assume for the purposes of illustration, a negative signal is impressed on the grid of tube 39. The control winding of magnetic amplifier 42 does not completely demagnetize the core and the core is saturated during some part of each positive and negative half cycle of 400 C. P. S. voltage. When the core is saturated, a large amount of current flows through the windings of motor 25. The magnitude of the error signal determines the degree of demagnetization of the core of magnetic amplifier 42, and therefore the speed of rotation of motor 25. By applying the negative error voltage to tube 40 instead of tube 39, the direction of rotation of motor 25 is reversed.

Motor 25 drives gear pump 8 in a direction and at a speed necessary to change the pressure in chamber 3 at the same rate as the atmospheric pressure is changing. The high gain of servo controller 21 maintains the pressure differential between chambers 3 and 4 at an extremely small value. Thus the pressures at the inlet and outlet ports of pump 8 are essentially equal, and there is very little tendency for air leakage through the pump. An extremely high volumetric efficiency of air pump 8 is thereby attained. As previously explained, in reference to Equation 11, the angular velocity of shaft 26 of motor 25 is a measure of the vertical velocity of the aircraft. Since the most desired form of output is usually a D.-C. voltage which is proportional to the vertical velocity component of the aircraft, the angular velocity of shaft 26 is converted to a D.-C. voltage by means of a tachometer. In the preferred embodiment of the vertical velocity computer contemplated by this invention, a capacitor tachometer is used to accomplish this conversion.

A schematic drawing of capacitor tachometer 44 is shown in Fig. 3. Insulation cam 45 having cam surfaces 49, 50, 51, and 52 is keyed to output shaft 26. Three cam operated switches 46, 47, and 48 are positioned symmetrically around the periphery of cam 45 with their flexible lever arms riding on the cam surfaces. Surface 49 extends over an arc of 90° and actuates the flexible lever arm of each switch to make contact with the corresponding "A" terminal. Surface 50 extends over an arc of 210° and allows the flexible lever arm of each switch to make contact with the corresponding "B" terminal. Surfaces 51 and 52 extend over arcs of 30° and maintain the flexible lever arms in a neutral position making contact with neither terminal "A" nor terminal "B." Capacitor 53 is connected between the flexible lever arms of switches 46 and 47. A source (not shown) of constant D.-C. potential E is connected through resistor 54 to the "A" terminals of switches 47 and 48 while the "B" terminals of switches 47 and 48 are connected to ground. The flexible lever arm of switch 48 is connected to the "B" terminal of switch 46. The "A" terminal of switch 46 is connected through resistor 55 to an integrating network consisting of amplifier 56, resistor 57, and capacitor 58. The integrating network maintains a D.-C. voltage output $e_1$ which is the integral of a pulsed input.

In operation, capacitor tachometer 44 alternately charges capacitor 53 from the source of constant D.-C. potential E and discharges capacitor 53 into the integrating network. The direction of rotation of cam 45 determines the polarity of the charge on capacitor 53 at the time the camming action causes it to discharge into the integrating network. The speed of rotation of cam 45 determines the number of pulses or discharges coupled into the integrating network per unit time thereby determining the amplitude of the output D.-C. potential $e_1$.

The value of capacitor 53 and resistor 54 are determined by the time available to completely charge capacitor 53 to D.-C. potential E at the maximum useful angular velocity of shaft 26. The discharge circuit elements such as resistors 55 and 57 are determined by the time available to completely discharge capacitor 53 at the maximum useful angular velocity of shaft 26. Assuming the charging and discharging of capacitor 53 is complete, the D.-C. level of the output is given by $$e_1 = C_1 R_2 E S \tag{12}$$

where $C_1$ is the capacitance of capacitor 53, $R_2$ is the resistance of resistor 57 and E is the source potential. Substituting Equation 11 in Equation 12 and simplifying by combining the circuit constants produces $$e_1 = A_2 E \frac{v}{T_a} \tag{13}$$

Referring to Equation 13 the output signal from capacitor tachometer 44 has a $$\frac{1}{T_a}$$

factor where $T_a$ is the absolute ambient atmospheric temperature. When a highly accurate vertical velocity indication is desired, this temperature factor is removed from the D.-C. output voltage $e_1$. In the preferred embodiment of this invention this is accomplished by temperature correcting network 59 shown schematically in Fig. 4. Resistor 60 is selected with a high temperature coefficient with the variation of its resistance with temperature essentially linear over the usable temperature range. The temperature coefficient of resistivity of resistor 60 is preferably positive. The equation for the resistance $R_t$ of the resistor 60 as a function of the absolute temperature $T_a$ over the temperature range under consideration is $$R_t = K T_a - r$$

where $r$ is the biasing resistance. If another resistor 61 having a resistance equal to $r$ is placed in series with resistor 60, the total resistance $R'_t$ of the combination is $$R'_t = KT$$

This combination can be used to remove the $$\frac{1}{T_a}$$

factor by placing a large resistor 62 in series with resistors 60 and 61. When the D.-C. output voltage $e_1$ of capacitor tachometer 44 is impressed across these resistors in series, the current through the combination is essentially independent of the ambient temperature since it is determined primarily by the value of resistor 62. The temperature compensated output voltage $e_2$ is obtained across resistors 60 and 61. The value of this voltage is proportional to the applied voltage $e_1$ times the absolute ambient temperature. A temperature sensitive resistor of 100 ohms in series with a resistor 62 of 9,000 ohms has been used successfully. In order that the temperature corrective network is sensitive to true free atmospheric temperature, resistor 60 is preferably mounted in a vortex type probe similar to that described in report NRL 4008 entitled "Development of the NRL Axial-Flow Vortex Thermometer" which was published September 4, 1952, by the Naval Research Laboratory, Washington, D. C. The output voltage $e_2$ of temperature correcting network 59 is $$e_2 = k_v E v \qquad (14)$$

where $k_v$ is the vertical velocity conversion constant and is dependent on the circuit parameters.

Although the rate altimeter of this invention thus far described is unique in its very high sensitivity to minute variations in the vertical velocity of the aircraft, complete detection and correct indication of the instantaneous vertical velocity when the aircraft is subjected to sudden vertical accelerations is not obtained with optimum accuracy by using the rate altimeter alone. As an example, assume the aircraft is subjected to a sudden acceleration in the vertical direction. This acceleration results in increasing the rate of change of pressure in chamber 4. In order to correctly obtain an indication of the true vertical velocity of the aircraft, this increased rate must be balanced by a corresponding increased rate of change of pressure in chamber 3. In the rate altimeter of this invention, this is done by increasing the angular velocity of shaft 26. Since the angular velocity of shaft 26 is determined by the position of diaphragm 5 relative to capacitor plates 11 and 12, it is necessary to allow diaphragm 5 to move to a new position. A finite length of time is required to perform this movement during which time the output of temperature correcting network 59 is in error. It is further necessary to change slightly the magnitude of the pressure differential between chambers 3 and 4 in order to maintain diaphragm 5 in its new position. This means that the rate of change of pressure in chamber 3 is not continuously maintained exactly equal to the rate of change of static atmospheric pressure but lags for a finite time while the new pressure differential corresponding to the new vertical velocity is being established. These time delays, being proportional to the applied vertical acceleration, are eliminated in the vertical velocity computer contemplated by this invention by combining the output of temperature correcting network 59 with the output of accelerometer 63 in a smoothing network 64.

Accelerometer 63 is a conventional vertical accelerometer having a D.-C. output voltage $e_3$ which is $$e_3 = k_a E a \qquad (15)$$

where $a$ is the vertical acceleration, E is the same D.-C. voltage that is applied to capacitor tachometer 44 and $k_a$ is the accelerometer conversion constant. By utilizing the same source of D.-C. voltage E for both the capacitor tachometer and the accelerometer portions of the circuit, a highly stable D.-C. source is not necessary, since any variations in voltage E affects both component parts equally. A schematic drawing of a typical linear accelerometer is shown in Fig. 5. Mass 75 is normally supported in the position indicated by springs 76 and 77. Wiper 78 is rigidly attached to mass 75 and makes electrical contact with potentiometer 79. Accelerations in the directions of arrows 80 cause movement of mass 75 and wiper 78 overcoming the centering action of springs 76 and 77. Thus wiper 78 picks off a D.-C. potential from potentiometer 79 which is proportional to the linear acceleration.

Referring to Fig. 4, the preferred smoothing network 64 is shown. The circuit parameters are selected with the view of obtaining optimum elimination of the various error signals which appear in the outputs of the rate altimeter and the accelerometer. Thus the function of smoothing network 64 is not only to combine voltages $e_2$ and $e_3$ to compensate for the time lag inherent in the rate altimeter when subjected to large vertical accelerations, but also to remove the error ripples from the output. The optimum values of the circuit parameters utilized in the smoothing network to eliminate error ripples are dependent on the error spectra of each individual instrument. However, it has been found that satisfactory smoothing of the error signals can be obtained by adjusting the circuit parameters of the smoothing network of Fig. 4 to satisfy the following equations $$RC = T$$

$$R_a C_a = 2T$$

$$R_v C_a \frac{k_a}{k_v} = T^2$$

where $k_a$ and $k_v$ are the conversion factors for the vertical acceleration and vertical velocity components, respectively, and T is a time constant dependent on the time lag of the particular vertical velocity computer used. A time constant T of five seconds has been successfully used to obtain an accurate measure of the vertical velocity while subjecting an aircraft to vertical accelerations of up to .5 g. The output voltage $e_4$ of smoothing network 63 is $$e_4 = A_3 E v \qquad (16)$$

Voltage output $e_4$ of smoothing network 64 is converted to an angular displacement $\theta$ by output servo 65. Wiper 66 of indicator 67 makes contact with potentiometer winding 68. Potentiometer 68 is connected across the same source of D.-C. voltage E that was utilized by accelerometer 63 and capacitor tachometer 44. Therefore variations in the D.-C. supply voltage E do not affect the position of wiper 66. The voltage $e_4$ coupled into output servo 65 through resistor 69 is normally exactly balanced by the voltage picked off by wiper 66 from potentiometer 68 and fed back through resistor 70. Any change in the vertical velocity $v$ changes input voltage $e_4$ unbalancing the output servo circuit. Lead network 71, which is similar in principle to lead network 41, detects the unbalanced condition and actuates motor 72 through chopper 73 and amplifier 74 to drive wiper 66 in a direction to restore a balanced condition. The position of wiper 66 is therefore a highly accurate indication of the vertical velocity component of the aircraft.

The vertical velocity computer described above has a much more rapid response to changes in vertical velocity than previous computers. By utilizing the constant volume principle and varying the pressure in a sealed chamber at the same rate as variations in static atmospheric pressure, a rapidly responsive indication of the vertical velocity of an aircraft is obtained. Compensation for changes in the ambient atmospheric temperature increases the accuracy of the indication. By combining the output of this pressure sensitive element with an accelerometer, the instantaneous vertical velocity of an object in air when subjected to vertical accelerations is obtainable with much better resolution and greater accuracy than was obtainable from any previously known apparatus.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A rate altimeter comprising a constant volume sealed chamber, a pressure sensitive element responsive to the pressure differential between said chamber and the static atmosphere, servo means responsive to said sensitive element for varying the pressure in said chamber to maintain said pressure differential substantially at zero, and means for indicating the rate said servo means varies the pressure in said chamber whereby the rate of varying said pressure is the measure of the rate of change of altitude.

2. A rate altimeter comprising a constant volume sealed chamber containing a compressible fluid, pressure sensitive means responsive to the pressure differential between said chamber and the static atmosphere, servo means responsive to said pressure sensitive means for changing the amount of compressible fluid in said chamber to maintain said pressure differential constant, and means responsive to said servo means for indicating the rate at which said servo means changes the amount of compressible fluid in said chamber whereby the rate of changing said fluid is a measure of the vertical velocity of said rate altimeter.

3. A vertical velocity computer for measuring the vertical velocity component of an object in air comprising a sealed chamber, a second chamber, means subjecting said second chamber to the static atmosphere, pressure sensitive means responsive to the pressure differential between said sealed chamber and said second chamber, displacement means coupling said sealed chamber to said second chamber and responsive to said pressure sensitive means in a manner to maintain said pressure differential substantially at zero by bidirectionally conveying air between said sealed chamber and said second chamber and means responsive to said displacement means for indicating the rate at which said displacement means conveys air between said sealed chamber and said second chamber whereby said rate of said displacement means is a measure of the vertical velocity component of said object in air.

4. A vertical velocity computer for measuring the vertical velocity component of an object in air comprising a constant volume sealed chamber, duct means open to the atmosphere in a manner to be continuously subjected to static atmospheric pressure, pressure sensitive means subjected to the pressure differential between said chamber and said duct means, displacement means connected to bidirectionally convey air between said chamber and said duct means, means for indicating the volumetric rate of conveyance of said air conveyed between said chamber and said duct means, and a servo controller responsive to said pressure sensitive means and connected to actuate said displacement means to maintain said pressure sensitive means in equilibrium whereby the volumetric rate of conveyance of said air between said chamber and said duct means is an accurate measure of the vertical velocity component of said object in air.

5. A rate altimeter for measuring the vertical velocity component of an object in air comprising a casing having two chambers, a reversible air pump, a duct connecting one of said chambers to one side of said air pump, ducts connecting the other of said chambers to the other side of said air pump and to the static atmosphere, pressure sensitive means between said chambers sensitive to the pressure differential between said chambers, pick-off means responsive to the movement of said pressure sensitive means, servo means responsive to said pick-off means and connected to drive said pump in a direction and at a speed necessary to maintain said pressure differential substantially at zero and indicating means connected to measure the speed and direction at which said servo means drives said air pump whereby the volumetric rate of displacement of said air pump is a meature of the instantaneous vertical velocity component of said object in air.

6. Means for measuring the vertical velocity component in air comprising a casing having a constant volume sealed chamber and a second chamber, a flexible diaphragm subjected to the pressure differential between said chambers, duct means coupling the static atmosphere into said second chamber, reversible constant volume displacement means connected to convey air between said chambers, indicating means connected to measure and indicate the rate and direction said reversible constant volume displacement means conveys air between said chambers, pick-off means sensitive to the movement of said diaphragm in response to said pressure differential, and servo means responsive to said pick-off means and connected to actuate said displacement means in a manner to maintain the rate of change of pressure in said sealed chamber equal to the rate of change of pressure in said second chamber, whereby the rate of displacement of said displacement means is a measure of said vertical velocity component.

7. A vertical velocity computer for accurately measuring the vertical velocity component of an aircraft comprising a casing attached to said aircraft, a gas tight constant volume chamber in said casing, a second chamber in said casing, conduit means subjecting said second chamber to the static atmosphere, a duct interconnecting said two chambers, a constant volume displacement air gear pump positioned in said duct to regulate the flow of air between said chambers, a flexible diaphragm positioned to flex in response to the pressure differential between said chambers, capacitive pick-off means sensitive to the flexure of said diaphragm, servo means responsive to the unbalance of said pick-off means and having an output shaft coupled to drive said air gear pump to regulate the flow of air between said chambers in a manner to maintain said pressure differential at a constant value and means for indicating the angular velocity and direction of rotation of said gear pump whereby the angular velocity of said gear pump is proportional to the vertical velocity component of the aircraft.

8. A computer as recited in claim 7 in which said indicating means includes a tachometer operatively connected to said output shaft and having a signal output proportional to the angular velocity of said output shaft.

9. A vertical velocity computer for measuring the vertical velocity of an aircraft comprising a casing enclosing a constant volume chamber, a pressure sensitive element responsive to the pressure differential between said chamber and the static atmosphere, servo means responsive to said sensitive element and connected to change the amount of air in said chamber in a manner to maintain said pressure differential substantially at zero, means for generating an output voltage proportional to the volumetric rate of change of air in said chamber by said servo means, and temperature compensating means including a resistor having a high positive temperature coefficient of resistivity subjected to the ambient atmospheric temperature, a second resistor materially larger than said first-named resistor and connected in series therewith, said series connected resistors being subjected to the output voltage of said generating means whereby the output of said temperature compensating means as measured across said first-named resistor is an accurate measurement of the vertical velocity of said aircraft.

10. A vertical velocity computer comprising an enclosed chamber, a pressure sensitive element responsive to the pressure differential between said chamber and the static atmosphere, constant volume displacement means connected to bidirectionally change the amount of air in said enclosed chamber, means for generating a voltage output proportional to the volumetric rate of changing the air in said chamber by said displacement means, servo means responsive to said pressure sensitive means and connected to actuate said displacement means to maintain said pressure differential substantially at zero, and temperature compensating means including a resistor having a high temperature coefficient of resistivity, a second resistor materially larger than said first-named resistor and connected in series therewith and means subjected to said first-named resistor to the free atmospheric temperature, said series resistor circuit being subjected to said voltage output of said voltage generating means whereby the voltage across one of said resistors is an accurate measurement of the vertical velocity in air.

11. A vertical velocity computer for measuring the vertical velocity component of an object in air comprising a casing having two chambers, a reversible air pump, a duct connecting one of said chambers to one side of said air pump, ducts connecting the other of said chambers to the other side of said air pump and to the static atmosphere, pressure sensitive means between said chambers sensitive to the pressure differential between said chambers, pick-off means responsive to the movement of said pressure sensitive means, servo means responsive to said pick-off means and connected to drive said pump in a direction and at a speed necessary to maintain said pressure differential substantially at zero, detector means responsive to said servo means and having an output voltage proportional to the speed of said air pump, and temperature compensating means including a resistor having a positive temperature coefficient of resistivity, a second resistor materially larger than the said first-named resistor and connected in series therewith, and means subjecting said first-named resistor to the free atmospheric temperature, said series connected resistors being connected across the output voltage of said detector means whereby the voltage across said first-named resistor is an accurate measure of the vertical velocity component of said object in air.

12. A vertical velocity computer for measuring the vertical velocity of an aircraft comprising a constant volume sealed chamber; duct means opening to the atmosphere in a manner to be subjected to static atmospheric pressure; pressure sensitive means subjected to the pressure differential between said chamber and said duct means; constant volume displacement means connected to transfer air between said chamber and said duct means, servo means responsive to the displacement of said pressure sensitive means and connected to actuate said displacement means in a manner to maintain said pressure differential substantially at zero, means for generating an output voltage proportional to the volumetric rate of displacement of said displacement means; and a temperature corrective network having a large and a small resistor connected in series subjected to said output voltage of said voltage generating means, said small resistor being maintained at the ambient atmospheric temperature and having a high temperature coefficient which is essentially constant over the operable temperature range, and said large resistor having a resistance which is independent of temperature whereby the signal across said smaller resistor is an accurate measure of the vertical velocity component of the aircraft.

13. A vertical velocity computer for measuring the vertical velocity of an aircraft comprising a vertical accelerometer having an output signal which is proportional to the vertical acceleration of said aircraft, a rate altimeter which measures the volumetric rate of changing the amount of air in a constant volume sealed chamber in order to maintain the rate of change of pressure in said chamber equal to the rate of change of static atmospheric pressure and which has an output signal which is equivalent to said volumetric rate of change and is a predetermined function of the vertical velocity of said aircraft, said rate altimeter output having a finite time delay when said aircraft is subjected to vertical accelerations during which time the rate of change of pressure in said sealed chamber lags the rate of change of the static atmospheric pressure by a predetermined function of said vertical acceleration and a smoothing network means combining the outputs of said accelerometer and said rate altimeter to compensate for said time delay whereby the output of said smoothing network means is a continuous measure of the instantaneous vertical velocity of said aircraft.

14. A device as recited in claim 13 in which said rate altimeter comprises a constant volume sealed chamber, duct means opening to the atmosphere in a manner to be subjected to static atmospheric pressure, pressure sensitive means responsive to the pressure differential between said chamber and said duct means, constant volume displacement means connected to change the amount of air in said chamber responsive to said pressure sensitive means to maintain said pressure differential at a predetermined constant value for each different vertical velocity, detector means having an output voltage proportional to the volumetric rate of displacement of said displacement means, and temperature compensating means subject to said output voltage of said detector means and having an output proportional to the product of said output of said detector means and the absolute ambient atmospheric temperature, said temperature compensating means including a resistor having a linear positive temperature coefficient of resistivity, a second resistor materially larger in resistance than the first-named resistor and connected in series therewith, and means subjecting said first-named resistor to the free atmospheric temperature and in which said output of said temperature compensating means is measured across said first-named resistor whereby said output of said temperature compensating means is proportional to the vertical velocity of said rate altimeter.

15. A vertical velocity computer for accurately measuring the instantaneous vertical velocity component of an aircraft comprising barometric rate altimeter having a constant volume sealed chamber, servo means for changing the pressure in said chamber at the same rate as changes in static atmospheric pressure and a voltage output proportional to the rate of change of pressure in said chamber by said servo means, said barometric rate altimeter having a finite time lag when said aircraft is subjected to vertical accelerations, a vertical accelerometer having a voltage output proportional to the vertical acceleration of said aircraft, and smoothing network means combining the outputs of said accelerometer and said rate altimeter to compensate for said time lag whereby the output of said smoothing network means is a continuous measure of the instantaneous vertical velocity of the aircraft.

16. A highly accurate vertical velocity computer for continuously measuring the vertical velocity component of an aircraft comprising a casing having two chambers, conduit means connected to one of said chambers and opened to the atmosphere in a manner to be subjected to the static atmosphere, a duct interconnecting said two chambers, a constant volume displacement gear pump positioned in said duct to regulate the flow of air between said chambers, a flexible diaphragm positioned to flex in response to the pressure differential between said two chambers, pick-off means sensitive to the flexure of said diaphragm, servo means responsive to the unbalance of said pick-off means and having an output shaft coupled to drive said gear pump to regulate the flow of air between said chambers in a manner to maintain said pressure differential substantially at zero, a tachometer having a voltage output proportional to the velocity of said output shaft, a temperature compensating network subjected to the voltage output of said tachometer and to the ambient atmospheric temperature and having an output proportional to the product of the output of said tachometer and the absolute ambient temperature, a vertical accelerometer and smoothing network means combining the outputs of said vertical accelerometer and said temperature compensating network in proportions to compensate for time lags in said servo means caused by changes in the magnitude of said pressure differential when said aircraft is subjected to vertical accelerations whereby the output of said smoothing network means is a continuous measure of the instantaneous vertical velocity of said aircraft.

17. A rate altimeter comprising a constant volume sealed chamber containing a compressible fluid, pressure sensitive means responsive to the pressure differential between said chamber and the static atmosphere, a constant volume displacement pump connected between said sealed chamber and the static atmosphere, a servo controller connected to actuate said pump to bidirectionally change the amount of compressible fluid in said chamber in response to said pressure sensitive means to maintain said pressure differential substantially constant, and means for indicating the rate of changing the amount of said fluid in said chamber by said pump whereby the rate of displacement of said pump is a measure of the vertical velocity of said rate altimeter in air.

References Cited in the file of this patent

UNITED STATES PATENTS

| | | |
|---|---|---|
| 2,127,836 | Urfer | Aug. 23, 1938 |
| 2,269,068 | Corbin | Jan. 6, 1942 |

FOREIGN PATENTS

| | | |
|---|---|---|
| 352,702 | Great Britain | July 16, 1931 |